US005985425A

United States Patent [19]

Tomizawa et al.

[11] Patent Number: 5,985,425

[45] Date of Patent: Nov. 16, 1999

[54] INK-JET RECORDING FILM OF IMPROVED INK FIXING COMPRISING A COMBINATION OF SILICA POWDERS

[75] Inventors: Tadashi Tomizawa, Koshigaya; Yoshiomi Nakaya, Kasukabe; Naoki Sakazume; Kenji Akuta, both of Koshigaya, all of Japan

[73] Assignee: SOMAR Corporation, Japan

[21] Appl. No.: 09/052,128

[22] Filed: Mar. 31, 1998

[30] Foreign Application Priority Data

Mar. 31, 1997 [JP] Japan .................................... 9-080968

[51] Int. Cl.[6] ................................ B41M 5/00; B32B 5/16

[52] U.S. Cl. .......................... 428/212; 428/195; 428/323; 428/331; 428/334; 428/337; 428/341; 428/523; 428/704; 428/307.3; 428/316.6; 428/317.1; 428/317.7; 347/105

[58] Field of Search .................................... 428/212, 323, 428/331, 334, 337, 341, 195, 304.4, 307.3, 316.6, 317.1, 523, 704, 317.7; 347/105, 106

[56] References Cited

U.S. PATENT DOCUMENTS

| | | | |
|---|---|---|---|
| 4,758,461 | 7/1988 | Akiya et al. | 428/212 |
| 5,185,213 | 2/1993 | Fujita et al. | 428/500 |
| 5,213,873 | 5/1993 | Yasuda et al. | 428/195 |
| 5,468,564 | 11/1995 | Ohtani et al. | 428/537.5 |
| 5,827,363 | 10/1998 | Darsillo et al. | 106/484 |

FOREIGN PATENT DOCUMENTS

| | | |
|---|---|---|
| 2-30582 | 1/1990 | Japan . |
| 5-286228 | 11/1993 | Japan . |
| 8-156396 | 6/1996 | Japan . |

*Primary Examiner*—Marie Yamnitzky
*Attorney, Agent, or Firm*—Wenderoth, Lind & Ponack, L.L.P.

[57] ABSTRACT

An ink-jet recording film capable of exhibiting excellent ink fixing behavior in ink-jet printing with a water-base ink along with good water resistance of the recording layer, which has a double-layered structure, as formed on the surface of a plastic substrate film, consisting of (A) an ink-receptive layer comprising a water-soluble resin, e.g., polyvinyl alcohol, polyvinyl acetal and/or polyvinyl pyrrolidone, a surface-roughening agent which is a combination of two different silica powders distinguishable in the low and high values of oil absorption in a specified weight proportion and a crosslinking agent for the water-soluble resin and (B) an overcoating layer for dot-profile control consisting of an acrylic resin of the quaternary ammonium salt type.

10 Claims, No Drawings

INK-JET RECORDING FILM OF IMPROVED INK FIXING COMPRISING A COMBINATION OF SILICA POWDERS

BACKGROUND OF THE INVENTION

The present invention relates to a novel ink-jet recording film or, more particularly, to an ink-jet recording film capable of exhibiting good fixing behavior for water-base inks or, in particular, pigment-containing water-base ink and also exhibiting excellent water resistance.

Along with the remarkable prevalence of the application technology of computers in recent years, it is now widely and frequently practiced to make a print-out record of the computerized data by using a printer. Various types of printers are now under use for this purpose including dot-impact printers, laser printers, thermal printers and ink-jet printers, of which ink-jet printers are employed most widely by virtue of the outstandingly low machine noises and the low operation costs. While the sheet material on which the ink-jet recording is made by using an ink-jet printer can be a plain paper sheet or coated paper sheet for most purposes, it is also frequently the case with a special purpose that ink-jet recording is made on a specific ink-jet recording film prepared by coating a surface of a plastic film as a substrate film with a specifically formulated coating composition comprising a hydrophilic polymeric resin to form an ink-receptive layer.

Various proposals and attempts are made relating to the formation of the above mentioned ink-receptive layer on the substrate surface for an ink-jet recording film. For example, Japanese Patent Publication 6-4247 proposes an ink-jet recording film having an ink-receptive layer containing polyvinyl alcohol and polyvinyl pyrrolidone. Japanese Patent Kokai 5-262028 discloses an ink-jet recording film consisting of a substrate film and a multi-layered ink-receptive layer composed of at least two layers, of which the outermost layer is formed from a coating composition containing a polyvinyl acetal resin and the undercoating layer to the outermost layer contains a water-soluble resin. Further, Japanese Patent Kokai 5-286228 proposes a double-coated ink-jet recording film, of which a substrate film is provided, on one surface, with a dye-absorbing layer and, on the other surface, with a layer of a water-swellable resinous material such as a mixture of polyvinyl alcohol and polyvinyl pyrrolidone. Thus, it is the prior art in the technology of ink-jet recording films to use polyvinyl alcohol, polyvinyl acetal, polyvinyl pyrrolidone or a combination thereof as the resinous constituent in the ink-receptive layer.

When the ink-receptive layer of an ink-jet recording film is formed from a combination of these hydrophilic resins, however, serious defects are unavoidable of the recording film including the low water resistance of the ink-receptive layer and tackiness of the surface of the ink-receptive layer if not to mention the relatively poor performance not to fully satisfy the requirements for ink-jet recording films that the ink droplets formed by the jet of ink do not unduly spread to have an increased diameter of the ink dots, that each of the ink dots has a profile as close to a true circle as possible and that the profile of the ink dot is generally circular without rugged contour not to show a polygonal or asteriated pattern resulting in a decrease in the pattern resolution and sharpness of the image lines.

With an object to overcome these defects, a proposal is made in Japanese Patent Kokai 8-156396 for an ink-jet recording film having, on the surface of a substrate film, successively laminated layers including (A) an ink-receptive layer formed from a composition comprising, as the principal ingredients, polyvinyl alcohol, polyvinyl acetal or a combination thereof and a fine particulate material and (B) an overcoating layer containing a dot profile controlling agent but this recording film is still not quite satisfactory in respect of fixing of the ink.

SUMMARY OF THE INVENTION

The present invention accordingly has an object to provide, by overcoming the above described defects of the conventional ink-jet recording films for printing by using a water-base ink, an improved ink-jet recording film capable of satisfying, in addition to the desirable properties to exhibit excellent fixing behavior for a water-base ink or, in particular, pigmented water-base ink and to be free from a decrease in the water resistance and appearance of stickiness over a long period of storage, the requirements for an ink-jet recording film that the ink dots have a profile close to a true circular form and the printed image has high pattern resolution so as to be suitable for writing and drawing with a water-base ink, in particular, on an ink-jet printer, ink-jet plotter, pen plotter and the like.

Thus, the ink-jet recording film provided by the present invention is a sheet material comprising:

(a) a substrate film; and (b) a double-layered recording layer consisting of

- (A) an ink-receptive layer containing a water-soluble resin, a surface roughening agent and a crosslinking agent and formed on one of the surfaces of the substrate film; and
- (B) an overcoating layer containing a dot-profile controlling agent formed on the ink-receptive layer, the surface roughening agent contained in the ink-receptive layer being a combination of at least two kinds of synthetic silica powders having different values of oil absorption.

The amount of the above mentioned surface roughening agent in the ink-receptive layer is selected in such a way that the recording layer of the ink-jet recording film has a standard wipe-off of 20 to 100 times and the fixing time of a water-base ink does not exceed 5 minutes.

DETAILED DESCRIPTION OF THE PREFERRED EMBODIMENTS

The above defined ink-jet recording film having improved properties of the present invention has been completed as a result of the extensive investigations undertaken by the inventors which have led to an unexpected discovery that the problems and disadvantages in the prior art ink-jet recording films can be overcome when a substrate film is provided on one surface with an ink-receptive layer containing two kinds of synthetic silica powders having different values of oil absorption as a surface roughening agent and an overcoating layer containing a dot-profile controlling agent.

The above mentioned synthetic silica powders are characterized by the value of oil absorption, which is a parameter to be determined by the procedure specified in JIS K 5101. The recording layer of the inventive ink-jet recording film, which consists of the above mentioned ink-receptive layer and the overcoating layer, is also characterized by the number of the standard wipe-off rubbings which can be determined by using a testing machine therefor such as the peeling/slipping/scratch tester (Model HEIDON 14, manufactured by Heidon Co.). Namely, the number of wipe-off rubbings is the number of times of rubbing, with a fully wet cotton gauze held on the testing machine and moved in reciprocation at a velocity of 4000 mm/minute under a load of 323 g, the ink-jet recording film until appearance of three spots of each at least 1 $mm^2$ area where the recording layer has been peeled off. A further important parameter, by which the ink-jet recording film of the invention can be characterized, is the ink fixing time which is determined in such a manner that line patterns of 0.5 mm, 1.0 mm and 1.5 mm widths are printed on the ink-jet recording film by using an ink-jet printer (Model Design Jet 750C, manufactured by Hewlett Packard Co.) with a black-pigmented water-base ink and, after lapse of every 1 minute time from printing, the line patterns are rubbed with a plastic eraser (Super Eraser Zero, a product by Xerox Corp.) perpendicularly to the running direction of the printed lines to determine the minimum length of time until the rubbing movement of the eraser no longer causes smear of the ink over the recording film.

The substrate film, on which the recording layer is formed to give the ink-jet recording film of the invention, is not particularly limitative and can be selected from those conventionally used in ink-jet recording films of the prior art including films of polyethylene terephthalate, polyethylene, polypropylene, polyamide and other resins without particular limitations, of which films of a polyethylene terephthalate resin are particularly preferred. The thickness of the substrate film can be in the range from 5 to 350 μm or, preferably, from 50 to 100 μm, though widely dependent on the particularly intended application of the ink-jet recording film.

In the preparation of the inventive ink-jet recording film, at least one of the surfaces of the substrate film is provided with an ink-receptive layer formed thereon. It is optional, if desired, to form an undercoating layer on the surface of the substrate film prior to formation of the ink-receptive layer to intervene between the substrate surface and the ink-receptive layer. The undercoating layer is formed by coating the substrate surface with a coating solution containing a resinous ingredient such as saturated polyester resins and urethane resins, of which urethane resins are preferred in respect of the good adhesion of the undercoating layer to the ink-receptive layer. The thickness of the undercoating layer is usually in the range from 0.5 to 1.5 μm.

The ink-receptive layer, which is formed either directly on the surface of the substrate film or on the undercoating layer, is a layer consisting, as the principal ingredients, of a water-soluble resin, surface roughening agent and crosslinking agent. The water-soluble resin in the ink-receptive layer can be any of the polymeric materials used as a binder in the conventional ink-jet recording films including polysaccharides such as starch, cellulose, tannin, lignin, alginic acid and gum arabic, natural polymeric compounds such as gelatin and synthetic polymeric compounds having water-solubility such as polymers and copolymers consisting of the monomeric units derived from vinyl acetate, ethylene oxide, acrylic acid, acrylamide, maleic anhydride and phthalic acid as well as water-soluble polyesters and polyamines, of which modified and unmodified polyvinyl alcohols, polyvinyl acetals and polyvinyl pyrrolidones are preferred in respect of the good ink-receptivity and color reproducibility of the ink-receptive layer. These water-soluble polymeric materials can be used either singly or as a combination of two kinds or more according to need. For example, a preferable water-soluble resinous ingredient is a 9:1 to 5:5 by weight combination of a polyvinyl alcohol, polyvinyl acetal or a combination thereof with a polyvinyl pyrrolidone when an ink-receptive layer having excellent ink receptivity and color reproducibility is desired.

The polyvinyl alcohol as a water-soluble resin in the ink-receptive layer has an average degree of polymerization of at least 1000 or, preferably, in the range from 1000 to 3000. When a polyvinyl alcohol of which the average degree of polymerization is smaller than 1000 is used in the ink-receptive layer, the recording film suffers a decrease in drying or absorption of ink and water resistance of the recording layer. The polyvinyl alcohol can be a completely or partially saponified polyvinyl acetate having a degree of saponification of at least 75% or, preferably, a partial saponification product having a degree of saponification in the range from 75 to 90%. When the degree of saponification is too low, retardation is caused in the absorption of ink. The polyvinyl acetal is a reaction product obtained by the acetalization reaction of a polyvinyl alcohol with an aldehyde.

The polyvinyl acetal used in the ink-receptive layer should have a degree of acetalization in the range from 2 to 20% or, preferably, from 5 to 15%. When the degree of acetalization is too low, the water resistance of the recording layer cannot be high enough while, when the degree of acetalization is too high, a decrease is caused in the drying behavior of ink and crosslinkability as mentioned later although the water resistance of the recording layer can be as high as desired.

The polyvinyl pyrrolidone used in the ink-receptive layer should have an average molecular weight of at least 40,000 or, preferably, in the range from 600,000 to 2,800,000. When the average molecular weight of the polyvinyl pyrrolidone is too low, a decrease is caused in the velocity of ink absorption and ink receptivity resulting in a decrease in the drying behavior of ink.

It is important in the formulation of the ink-receptive layer that the coating composition therefor is admixed with a crosslinking agent for the water-soluble resin in order to improve the water resistance of the recording layer. The types of the crosslinking agent naturally depend on the kind of the water-soluble resin to be crosslinked. For example, urea is suitable when the water-soluble resin is a polyvinyl alcohol or polyvinyl acetal. The amount of urea added to the coating composition for the ink-receptive layer is in the range from 4 to 12 parts by weight or, preferably, from 5 to 10 parts by weight per 100 parts by weight of the polyvinyl alcohol or polyvinyl acetal. When the amount of the crosslinking agent is too small, no sufficient improvement can be obtained in the water resistance of the recording layer while, when the amount thereof is too large, the ink-receptive layer would be poor in the absorptivity of ink due to overly crosslinking. Though optional, the coating composition for the ink-receptive layer is admixed with a crosslinking-promoting catalyst in an amount, usually, in the range from 20 to 100% by weight based on the amount of the crosslinking agent.

It is essential in the present invention that the coating composition for forming the ink-receptive layer is compounded with a surface-roughening agent which is a combination of two kinds or more of synthetic silica powders which can be distinguishable each from the others in terms of the amount of oil absorption. The synthetic silica powder should have an average particle diameter in the range from 1 to 6 μm or, preferably, from 1.5 to 4.0 μm. When the silica powder is too fine, the ink-receptive layer would not have transparency in due balance with the compounded amount of the silica powder while, when the silica powder is too coarse, the profile of the ink dot formed by ink-jet printing on the recording film would not be circular but the dot takes a polygonal or cornered profile so that a decrease is caused in the pattern resolution of the images formed by ink-jet printing.

The total amount of the synthetic silica powders in the ink-receptive layer is in the range from 50 to 200% by weight or, preferably, from 70 to 150% by weight based on the amount of the water-soluble resin. When the silica powder is a combination of two different silica powders distinguishable in terms of the amount of oil absorption, the silica powder of low oil absorption and silica powder of high oil absorption should have values of oil absorption in the range from 50 to 150 ml/100 g and from 200 to 300 ml/100 g, respectively, as determined by the testing procedure specified in JIS K 5101.

The weight proportion of the amounts of the silica powders of low and high oil absorption is in the range from 1:2 to 3:1. When the weight proportion of the high oil-absorption silica powder is too small, a decrease is caused in the ink fixing behavior of the recording layer while, when the weight proportion thereof is too large, irregularity is resulted in the profile of the ink dots formed by ink-jet printing along with a decrease in the transparency of the recording film.

The weight proportion of the two different synthetic silica powders is also a factor influencing the results of the standard wipe-off test and the test of ink fixing time. Namely, the weight proportion is adjusted in such a way that the number of times of the wipe-off rubbing is in the range from 20 to 100 times or, preferably, from 30 to 90 times and the ink fixing time does not exceed 5 minutes or, preferably, does not exceed 2 minutes. When the standard wipe-off rubbing times is too small, a trouble is eventually caused that the recording layer falls off the substrate surface while, when the number is too large, a decrease is caused in the ink absorption of the recording layer. When the ink fixing time is too long, blur is sometimes caused in the patterns formed by ink-jet printing due to spreading of the printing ink over the recording layer.

It is optional that the ink-receptive layer contains, besides the above described synthetic silica powders, one or more of conventional surface-roughening agents formulated in the ink-jet recording films of prior art including powders of zirconium oxide, clay, kaolin, alumina, titanium dioxide, zeolite, calcium carbonate, barium sulfate, magnesium hydroxide, calcium phosphate and glass, of which calcium carbonate is preferred because an improvement can be obtained therewith in the ink absorptivity of the ink-receptive layer without adverse influences on the profile of the ink dots. Further, an organic fine powder can be added as an auxiliary surface roughening agent including fine powders of a synthetic resin such as acrylic resins, urethane resins, polyvinyl chloride resins, benzoguanamine resins and benzoguanamine-melamine-formaldehyde condensation resins. The amount of these auxiliary surface roughening agents, when added either singly or as a combination of two kinds or more, is in the range from 50 to 100% by weight based on the total amount of the synthetic silica powders in order to obtain improvement in the ink drying and ink absorption behavior of the recording film.

The above described powders as the auxiliary surface roughening agent should have an average particle diameter in the range from 0.5 to 6.0 μm or, preferably, from 0.8 to 4.0 μm. When the powder is too fine, the recording film would be poor in the ink drying behavior while, when the powder is too coarse, a decrease is caused in the pattern resolution of the printed images due to a decrease in the circularity of the dot profile.

The ink-receptive layer of the inventive ink-jet recording film is formed by coating the surface of the substrate film, either directly or on the undercoating layer, with a coating composition prepared by dissolving or dispersing the above described water-soluble resin, surface roughening agent, crosslinking agent and other optional ingredients in an aqueous medium in a solid concentration of about 10 to 15% by weight followed by drying. It is of course optional according to need that the coating composition is further admixed with various kinds of known additives such as surface active agents, lubricants, stabilizers, coloring agents and others. The thickness of the ink-receptive layer is in the range from 5 to 30 μm or, preferably, from 10 to 20 μm after drying.

The ink-jet recording film of the invention is completed by forming an overcoating layer, which serves to control the profile of the ink dots formed by ink-jet printing, on the above described ink-receptive layer. The dot-profile controlling agent is preferably an acrylic resin of the quaternary ammonium salt type including copolymers of an alkyl (meth)acrylate with a dialkylamino acrylate or dialkylaminoalkyl methacrylate. Such a copolymeric resin is a known material and, for example, a commercial product is available and usable as such which is a quaternary ammonium salt derived from a 1:1 by moles copolymer of butyl methacrylate and dimethylaminoethyl methacrylate.

The overcoating layer, which contributes to the improvement of the circularity of the dot profile and prevention of blur of the ink, is formed by coating the ink-receptive layer with a coating composition prepared by dissolving the above described dot-profile controlling agent in a solvent which is a lower alcohol or a mixture of a lower alcohol with water followed by drying. In this way, the dot-profile controlling agent forms a definite overcoating layer on the ink-receptive layer although no particular problem is encountered even if a part of the dot-profile controlling agent is absorbed into the ink-receptive layer resulting in indefiniteness of the interface between the layers.

The coating amount of the above described overcoating layer is in the range from 3 to 10 $g/m^2$ calculated for the dot-profile controlling agent. When the coating amount thereof is too small, the sharpness or pattern resolution of the ink-jet printed images would be poor while, when the coating amount is too large, retardation is caused in the absorption and drying of the ink on the recording layer.

When the recording layer consisting of the ink-receptive layer and overcoating layer is formed only on one surface of the substrate film, the other surface of the substrate film is provided, though optional, with a matting layer or an ink-receptive layer. The matting layer is formed by coating the substrate surface with a coating composition containing a binder resin and a matting agent followed by drying. The binder resin, which can be thermoplastic, thermosetting or photocurable, is exemplified by acrylic resins, urethane resins, polyester resins and polyvinyl chloride resins. The matting agent is a fine powder of an inorganic material such as silica, zirconium oxide, clay, kaolin, alumina, titanium dioxide, zeolite, calcium carbonate, barium sulfate, magnesium hydroxide, calcium phosphate and glass or an organic synthetic resin such as acrylic resins, urethane resins, polyvinyl chloride resins, benzoguanamine resins and benzoguanamine-melamine-formaldehyde condensation resins. The matting agent in the form of a powder should have an average particle diameter in the range from 0.1 to 20 μm or, preferably, from 2 to 10 μm. It is optional that the coating composition for the matting layer is admixed with known additives such as surface active agents, lubricants, stabilizers and coloring agents. The thickness of the matting layer is in the range from 1 to 10 μm or, preferably, from 3 to 7 μm in order to obtain the effect of curling prevention and improvement in the pen-writing adaptability.

When the surface of the substrate film opposite to the recording layer is provided with an ink-receptive layer instead of the matting layer, the coating composition for the ink-receptive layer can be prepared in the same formulation as for the ink-receptive layer in the recording layer, optionally, with omission or decrease of the amount of the surface roughening agent.

The ink-jet recording film of the invention described above is suitable for ink-jet printing by using a water-base ink or, in particular, pigmented water-base ink on an ink-jet printer, ink-jet plotter or pen plotter to exhibit excellent fixing behavior of the ink without the troubles of smear by bleeding of the ink after ink-jet printing along with good circularity of the dot profile to give sharpness and high pattern resolution of the images formed by ink-jet printing in the recording layer. Moreover, the recording layer of the inventive recording film has high water resistance so that the images formed by ink-jet printing on the recording film are free from blur or undue broadening after printing to keep sharpness of the pattern. The recording layer is free from appearance of stickiness due to atmospheric moisture or perspiration, which might dissolve the ink-receptive layer of low water resistance, to facilitate handling and to improve the working efficiency.

In the following, the ink-jet recording film of the present invention is described in more detail by way of Examples which, however, never limit the scope of the invention in any way. In the following description, the term of "parts" always refers to "parts by weight". p In the following Examples and Comparative Examples, the ink-jet recording films prepared therein were subjected to the evaluation tests for the following items by the testing procedures respectively described there.

(1) Ink fixing time:

Line patterns having widths of 0.5 mm, 1.0 mm and 1.5 mm were formed on the ink-jet recording film by using an ink-jet plotter (Model Design Jet 750C, manufactured by Hewlett Packard Co.) with the black pigmented ink for the machine and, after lapse of every 1 minute interval from printing, the printed lines were rubbed with a plastic eraser (Super Eraser Zero, a product by Xerox Corp.) in the direction perpendicular to the running direction of the lines to record the minimum length of time before smear of the film due to spreading of the ink by rubbing no longer took place. The results are shown in the Table below in three ratings of A, B and C for the ink fixing time of less than 2 minutes, between 2 and 5 minutes and longer than 5 minutes, respectively.

(2) Water resistance

The recording layer of the ink-jet recording film was rubbed with a fully wetted gauze under a load of 323 g reciprocatingly at a velocity of 4000 mm/minutes as held on a peeling/slipping scratch tester (Model HEIDON 14, manufactured by Heidon Co.) and recording was made for the number of repeated rubbings by which appearance was noted of three bare spots each having an at least 1 $mm^2$ area due to falling of the recording layer by rubbing.

(3) Dot profile

The ink dots formed by ink-jet printing on the ink-jet recording film were visually inspected for the profile by using a stereomicroscope to record the result in two ratings of A for a sharp circular contour of the profile though with slight disorder and B for a disordered polygonal profile.

(4) Printing adaptability

A computer-processed line pattern was printed out on the ink-jet recording film by using the same ink-jet plotter as used in (1) above to form 10 parallel lines each of 0.176 mm width keeping a spacing of 0.220 mm and the line pattern was evaluated for the sharpness and blur due to spreading of the ink in three ratings of A, B and C according to the following criteria.

A: at least 9 lines recognizable

B: 7 or 8 lines recognizable

C: 6 lines or less recognizable

EXAMPLE 1

A coating composition for the ink-receptive layer was prepared by dissolving or dispersing, in a mixture of 40 parts of ethyl alcohol, 20 parts of propyleneglycol monomethyl ether and 122.2 parts of water, 4 parts of a polyvinyl pyrrolidone having an average molecular weight of 1,280,000, 6 parts of a polyvinyl alcohol having an average degree of polymerization of 2000 and degree of saponification of 88.0%, 3.5 parts of a first synthetic silica powder having an oil absorption value of 95 ml/100 g and an average particle diameter of 3.5 μm, 3.5 parts of a second synthetic silica powder having an oil absorption value of 210 ml/100 g and an average particle diameter of 3.5 μm, 0.6 part of urea and 0.2 part of ammonium chloride.

A polyethylene terephthalate film having a thickness of 50 μm provided on one surface with an undercoating layer of a urethane resin having a thickness of 1.0 μm was coated on the undercoating layer with the above prepared coating composition by using a wire bar coater followed by a heat treatment at 130° C. for 5 minutes to form an ink-receptive layer having a thickness of about 15 μm.

Separately, a coating solution for the overcoating layer was prepared by dissolving 1.0 part of an acrylic resin of the quaternary ammonium salt type (Saftomer CP-2000, a product by Mitsubishi Chemical Co.) as a dot-profile controlling agent in a mixture of 10.0 parts of ethyl alcohol and 89.0 parts of water. This coating solution was uniformly applied to the above formed ink-receptive layer followed by drying to form an overcoating layer of which the coating amount was 4 $g/m^2$ calculated for the dot-profile controlling agent.

In the next place, the surface of the substrate film opposite to the ink-receptive layer was coated with a coating composition prepared by dissolving or dispersing 20 parts of a water-soluble acrylic resin as a binder resin and 10 parts of a synthetic silica powder having an average particle diameter of 3.5 μm as a matting agent in 70 parts of water followed by a heat treatment at 130° C. for 2 minutes to form a matting layer having a thickness of 5 μm.

The results of the evaluation tests of the thus completed ink-jet recording film are shown in the Table below.

EXAMPLE 2

The experimental procedure was substantially the same as in Example 1 except that the coating composition for the ink-receptive layer was prepared with additional addition of 5 parts of a calcium carbonate powder having an average particle diameter of 2.0 μm and a decrease of water from 122.2 parts to 117.2 parts.

The results of the evaluation tests of the ink-jet recording film are shown also in the Table.

EXAMPLE 3

The experimental procedure was substantially the same as in Example 2 except that the polyvinyl alcohol used in the preparation of the coating composition for the ink-receptive layer was replaced with the same amount of a polyvinyl acetal having a degree of acetalization of 8.0%.

The results of the evaluation tests of the ink-jet recording film are shown also in the Table.

EXAMPLE 4

The experimental procedure was substantially the same as in Example 2 except that the amount of the polyvinyl pyrrolidone was decreased from 4 parts to 1 part and the amount of the polyvinyl alcohol was increased from 6 parts to 9 parts in the preparation of the coating composition for the ink-receptive layer.

The results of the evaluation tests of the ink-jet recording film are shown also in the Table.

EXAMPLE 5

The experimental procedure was substantially the same as in Example 2 except that the amount of the polyvinyl pyrrolidone was increased from 4 parts to 5 parts and the amount of the polyvinyl alcohol was decreased from 6 parts to 5 parts in the preparation of the coating composition for the ink-receptive layer.

The results of the evaluation tests of the ink-jet recording film are shown also in the Table.

EXAMPLE 6

The experimental procedure was substantially the same as in Example 2 except that, instead of forming a matting layer on the surface opposite to the recording layer, the surface is first provided with an undercoating layer of a urethane resin in a coating amount of 0.7 $g/m^2$ and then a coating layer having a thickness of 10 $\mu$m was formed thereon by applying, using a wire bar coater, a coating composition prepared by dissolving or dispersing, in a mixture of 30 parts of ethyl alcohol and 106.1 parts of water, 8 parts of a polyvinyl alcohol having an average degree of polymerization of 1700 and a degree of saponification of 88%, 4 parts of a polyvinyl pyrrolidone resin having an average molecular weight of 630,000, 1.5 parts of a polystyrene sulfonate salt (Chemistat 6120, a product by Sanyo Chemical Co.), 0.25 part of dimethylol glyoxal monourein and 0.2 part of ammonium chloride followed by a heat treatment at 130° C. for 5 minutes.

The results of the evaluation tests of the ink-jet recording film are shown also in the Table.

EXAMPLE 7

The experimental procedure was substantially the same as in Example 2 except that, instead of forming a matting layer on the surface opposite to the recording layer, the surface is first provided with an undercoating layer of a urethane resin in a coating amount of 0.7 $g/m^2$ and then a coating layer having a thickness of 10 $\mu$m was formed thereon by applying, using a wire bar coater, a coating composition prepared by dissolving or dispersing, in a mixture of 20 parts of ethyl alcohol and 69.66 parts of water, 7 parts of a polyvinyl alcohol having an average degree of polymerization of 1700 and a degree of saponification of 88%, 1 part of a polyvinyl pyrrolidone resin having an average molecular weight of 630,000, 2 parts of a polystyrene sulfonate salt (Chemistat 6120, supra), 0.2 part of dimethylol glyoxal monourein, 0.1 part of ammonium chloride and 0.04 part of a synthetic silica powder having an average particle diameter of 6 $\mu$m followed by a heat treatment at 130° C. for 5 minutes.

The results of the evaluation tests of the ink-jet recording film are shown also in the Table.

EXAMPLE 8

The experimental procedure was substantially the same as in Example 1 except that the coating composition for the ink-receptive layer was prepared by dissolving or dispersing, in a mixture of 30 parts of ethyl alcohol, 20 parts of propyleneglycol monomethyl ether and 121.23 parts of water, 7.5 parts of a polyvinyl pyrrolidone having an average molecular weight of 1,280,000, 11.2 parts of a polyvinyl alcohol having an average degree of polymerization of 1700 and degree of saponification of 88.0%, 2.4 parts of a first synthetic silica powder having an oil absorption value of 95 ml/100 g and an average particle diameter of 3.5 $\mu$m, 4.7 parts of a second synthetic silica powder having an oil absorption value of 210 ml/100 g and an average particle diameter of 3.5 $\mu$m, 2.4 parts of a calcium carbonate powder having an average particle diameter of 2.0 $\mu$m, 0.45 part of urea and 0.12 part of ammonium chloride.

The results of the evaluation tests of the ink-jet recording film are shown also in the Table.

EXAMPLE 9

The experimental procedure was substantially the same as in Example 1 except that the coating composition for the ink-receptive layer was prepared by dissolving or dispersing, in a mixture of 30 parts of ethyl alcohol, 20 parts of propyleneglycol monomethyl ether and 121.57 parts of water, 3.7 parts of a polyvinyl pyrrolidone having an average molecular weight of 1,280,000, 5.6 parts of a polyvinyl alcohol having an average degree of polymerization of 1700 and degree of saponification of 88.0%, 5.6 parts of a first synthetic silica powder having an oil absorption value of 95 ml/100 g and an average particle diameter of 3.5 $\mu$m, 5.6 parts of a second synthetic silica powder having an oil absorption value of 210 ml/100 g and an average particle diameter of 3.5 $\mu$m, 7.5 parts of a calcium carbonate powder having an average particle diameter of 2.0 $\mu$m, 0.34 part of urea and 0.09 part of ammonium chloride.

The results of the evaluation tests of the ink-jet recording film are shown also in the Table.

Comparative Example 1

The experimental procedure was substantially the same as in Example 2 excepting for the omission of the first synthetic silica powder and increase of the amount of the second synthetic silica powder from 3.5 parts to 7.0 parts in the preparation of the coating composition for the ink-receptive layer.

The results of the evaluation tests of the ink-jet recording film are shown also in the Table.

Comparative Example 2

The experimental procedure was substantially the same as in Example 2 excepting for the replacement of the second synthetic silica powder with the same amount of a third synthetic silica powder having an oil absorption value of 95 ml/100 g and an average particle diameter of 6.0 $\mu$m in the preparation of the coating composition for the ink-receptive layer.

The results of the evaluation tests of the ink-jet recording film are shown also in the Table.

TABLE

| | | Ink fixing time | Water resistance, times | Dot profile | Printing adapt-ability |
|---|---|---|---|---|---|
| Example | 1 | A | 40 | A | A |
| | 2 | A | 40 | A | A |
| | 3 | A | 30 | A | A |
| | 4 | A | 80 | A | A |
| | 5 | A | 80 | A | A |
| | 6 | A | 40 | A | A |
| | 7 | A | 40 | A | A |
| | 8 | A | 90 | A | A |
| | 9 | A | 20 | A | A |
| Comparative | 1 | A | 40 | B | B |
| Example | 2 | C | 40 | B | A |

What is claimed is:

1. An ink-jet recording film which is a layered sheet material comprising:

(a) a substrate film; and (b) a double-layered recording layer consisting of (A) an ink-receptive layer comprising a water-soluble resin, a surface roughening agent and a crosslinking agent and formed on one of the surfaces of the substrate film; and (B) an overcoating layer comprising a dot-profile controlling agent formed on the ink-receptive layer, the surface roughening agent contained in the ink-receptive layer being a combination of a first synthetic silica powder having a value of oil absorption in the range from 50 to 150 ml/100 g and a second synthetic silica powder having a value of oil absorption in the range from 200 to 300 ml/100 g each having an average particle diameter in the range from 1 to 6 μm in a weight proportion in the range from 1:2 to 3:1.

2. The ink-jet recording film as claimed in claim 1 in which the water-soluble resin contained in the ink-receptive layer is selected from the group consisting of a polyvinyl alcohol, polyvinyl acetal and polyvinyl pyrrolidone.

3. The ink-jet recording film as claimed in claim 2 in which the crosslinking agent contained in the ink-receptive layer is urea.

4. The ink-jet recording film as claimed in claim 3 in which the amount of urea contained in the ink-receptive layer is in the range from 4 to 12 parts by weight per 100 parts by weight of the water-soluble resin.

5. The ink-jet recording film as claimed in claim 2 in which the water-soluble resin is a combination of (a) a polyvinyl alcohol and/or polyvinyl acetal and (b) a polyvinyl pyrrolidone in a weight proportion in the range from 9:1 to 5:5.

6. The ink-jet recording film as claimed in claim 1 in which the substrate film is a plastic film having a thickness in the range from 25 to 250 μm.

7. The ink-jet recording film as claimed in claim 1 in which the total amount of the first and second synthetic silica powders contained in the ink-receptive layer is in the range from 50 to 200% by weight based on the weight of the water-soluble resin.

8. The ink-jet recording film as claimed in claim 1 in which the dot-profile controlling agent in the overcoating layer is a quaternary ammonium salt of an acrylic resin.

9. The ink-jet recording film as claimed in claim 8 in which the coating amount of the quaternary ammonium salt of an acrylic resin in the overcoating layer is in the range from 3 to 10 $g/m^2$.

10. The ink-jet recording film as claimed in claim 1 in which the ink-receptive layer has a thickness in the range from 5 to 30 μm.

* * * * *